Patented May 20, 1952

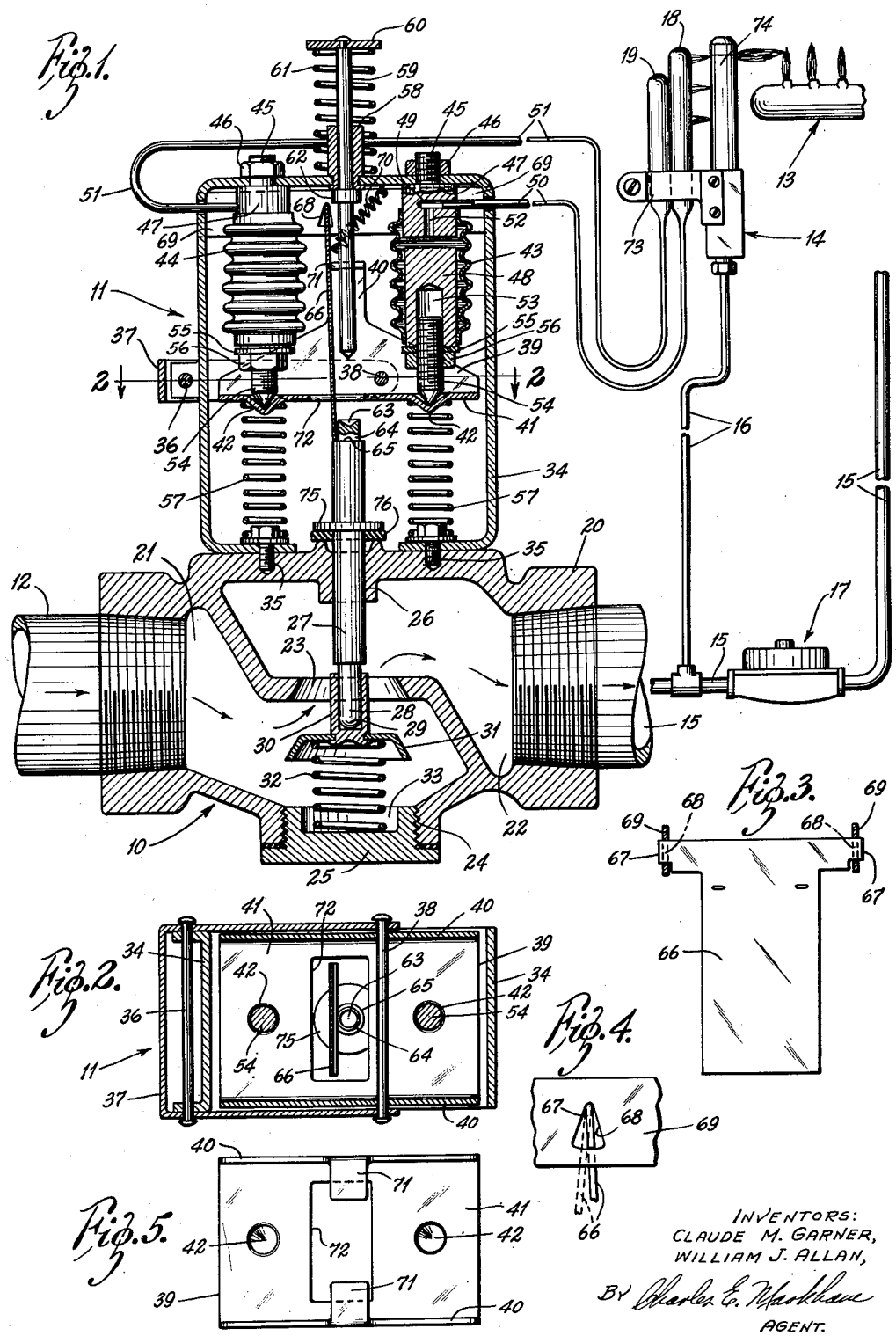

2,597,787

UNITED STATES PATENT OFFICE 2,597,787

SAFETY CUTOFF CONTROL SYSTEM WITH DUAL THERMAL ELEMENTS

Claude M. Garner, Clayton, and William J. Allan, Richmond Heights, Mo., assignors to Missouri Automatic Control Corporation, St. Louis, Mo., a corporation of Missouri Application May 26, 1947, Serial No. 750,536

2 Claims. (Cl. 158—127)

This invention relates to safety cut-off devices for use with fluid fuel burners, and more particularly to the trip and manual reset type in which a valve member being normally biased toward a fuel cut-off position may be moved manually to an open and set position from which it is released or tripped automatically upon loss of flame at the burner.

Reference is made to the co-pending application of Claude M. Garner, Serial Number 723,487, filed January 22, 1947, now abandoned, titled "Temperature Responsive Device," upon which the present invention is an improvement.

It is an object of the present invention to provide an improved safety fuel cut-off mechanism, for use with fluid fuel burners, which is actuated by a change in the pressure differential in a pair of fluid filled elements arranged to absorb heat at different rates from the burner, and in which one of the elements has greater fluid capacity than the other in order to maintain a minimum differential in working volume when the elements are subjected to high ambient temperatures which tend to equalize their temperatures and therefore the pressures of the fluids therein.

It is a further object of the present invention to provide, in a device of the above character, a novel poppet type valve and valve housing structure in which the valve is opened in a direction opposed to the flow and in which access to the interior of the valve housing for actuation of the valve by external means is at a point posterior of the valve and seat.

It is a further object of the present invention to provide, in a device of the above character, novel means for manually opening and latching in an open position a cut-off valve, wherein straight line valve actuating motion is achieved.

Further objects and advantages will appear from the following description and accompanying drawings. Referring to the drawings:

Fig. 1 is a schematic illustration of a form of the present invention, the view includes an enlarged cross-sectional view of the fuel cut-off valve and the valve actuating mechanism;

Fig. 2 is a cross section taken on line 2—2 of Fig. 1;

Fig. 3 is a side view of the pivoted detent shown in cross section in Fig. 1;

Fig. 4 is an enlarged detail showing the knife edge pivoting of the detent.

Fig. 5 is a plan view of the actuating lever.

Referring more particularly to the drawings, the schematic view, Fig. 1, shows a fuel cut-off valve generally indicated at 10. Mounted on the valve is a valve actuating assembly generally indicated at 11. Fuel enters the valve 10 through a conduit 12 and is distributed to a main burner (shown in part) generally indicated at 13 and to a pilot burner generally indicated at 14 through a fuel conduit 15 and a branch 16. Interposed in the fuel conduit 15 is a main burner control valve generally indicated at 17, which may be of any suitable type, and which is usually electrically operated and controlled in accordance with the requirements of the space to be heated. Attached to the pilot burner are a pair of fluid filled bulbs 18 and 19.

The cut-off valve 10 comprises a valve body 20 having an inlet 21, an outlet 22, and a valve seat 23. Valve seat 23 is tapered with its sides converging toward the outlet. There is a threaded bore 24 in the bottom wall of valve body 10 concentric with valve seat 23, and adapted to receive a screw plug 25. There is also a smaller bore 26 in the upper wall of the valve body concentric with the seat 23 and adapted to receive in sliding fit relationship a valve stem 27.

Valve stem 27 is reduced at its lower end as indicated at 28 and terminates in a rounded point 29. The reduced portion 28 has a free fit relationship with the inner diameter of a short socket member 30. Socket member 30, being a short piece of tubing closed at its lower end, is riveted to a cup-shaped valve member 31.

Valve 31 has tapered sides and is arranged for gas tight engagement with the seat 23. It will be seen that valve 31 opens in a direction opposed to the flow and that consequently line pressure assists in holding the valve closed. A spring 32 resting in a recess 33 in screw plug 25 normally urges valve 31 to a closed position. It will be seen that with the provision of the socket member 30, the free fit of the lower end 28 of valve stem 27 therein, and its rounded end, the valve 31 may seek a perfect engagement with its seat under the pressure of spring 32 without any danger of bias due to any slight non-concentricity as between the bore 26 and seat 23 or as between the stem 27 and the valve 31 which may occur in manufacture.

A frame 34 which encloses and supports the valve actuating mechanism is mounted on valve body 20 and attached thereto by screws 35. Pivotally supported on the left side of frame 34 on a pivot 36, is a horizontally arranged U-shaped yoke 37, which carries pivoted near its open free ends on a pivoted rod 38, an actuating lever 39. Lever 39 is also U-shaped having vertical legs 40 and a horizontal connecting platform 41. In the platform 41 are two conical shaped indentations 42, one on each side of the pivoted connection 38.

There is a pair of vertically mounted, elongated expansible elements 43 and 44 rigidly attached at their upper ends to the top cross member of frame 34 by studs 45 and nuts 46. These elements are of hollow, thin tube construction having transverse corrugations, and their use and operation are well known and understood in the art. These elements are provided with solid fillers 47 and 48 which are soldered or brazed to the inner walls of the elements at their outer ends to provide a joint which is gas tight under high pressure. These fillers serve the purpose of reducing the required volume of fluid in the system and minimizing the portion of fluid in the system affected by ambient temperature and not by the burner.

Studs 45 are formed as a part of upper fillers 47. There are horizontal bores 49 in upper fillers 47 which receive capillary tubes 50 and 51, and connecting vertical bores 52 communicating with the interior of the element. Lower fillers 48 have threaded bores 53 which receive adjusting studs 54. Lock washers 55 and lock nuts 56 are provided for locking studs 54 in an adjusted position.

Studs 54 have conically pointed lower ends which center in the conical indentations 42 in the horizontal platform portion of actuating lever 39. Lever 39 is held constantly in contact with the lower ends of studs 54 by return springs 57. Springs 57 are held in position at their lower ends by fitting over the heads of screws 35 and at their upper ends by fitting over the convex cones which incidentally result when forming the conical indentations 42.

Slidably mounted in a bushing 58 secured to the top cross member of frame 34 is a vertical manual reset plunger 59. Plunger 59 has a disc 60 riveted to its upper end and there is a return spring 61 which normally holds plunger 59 in its uppermost position. A collar 62 on plunger 59 limits its upward travel. The lower end of plunger 59 has a conical point arranged to engage with a conical recess 63 in the upper end of the valve stem 27.

Valve stem 27 has a reduced portion 64 at its upper end providing a sharp square shoulder 65. Adjacent and parallel with plunger 59 and valve stem 27 is a vertical plate-like detent 66. The detent 66 has lateral projections 67 at its upper edge (see Fig. 3) which engage triangular slots 68 in the horizontal plate members 69 which are attached to the upper part of frame 34. Thereby knife edge pivoting of detent 66 about its upper edge is provided. The lower edge of detent 66 is arranged to abut the shoulder 65 of the valve stem under certain conditions thus holding valve 31 open against the pressure of spring 32. The lower edge of detent 66 is normally urged toward the valve stem by a spring 70.

The upper ends of vertical legs 40 of actuating lever 39 are formed at a right angle providing the short horizontal portions 71 which, as lever 39 is rotated counterclockwise on its pivot 38, engage the detent 66. The horizontal portion 41 of the actuating lever 39 has a rectangular perforation 72 through which pass the detent, the plunger and the valve stem.

The fluid filled elements 18 and 19 are supported on the base of the pilot burner 14 by a clamp type support member 73. Elements 18 and 19 are connected to the expansible elements 43 and 44 respectively by fluid conduits 50 and 51 as indicated. The disposition of elements 18 and 19 with relation to the pilot burner head 74 and the flame issuing therefrom, is such that element 18 will receive heat at a greater rate than element 19. Also element 19 has less fluid capacity than element 18 whereby although the ambient temperature within the burner enclosure may cause the temperature, and therefore the pressure, of the fluid in 19 to closely approach that in element 18, even with the pilot flame burning, there will be a sufficiently greater volume available in bulb 18 to insure the relatively greater expansion of expansible element 43 and to prevent the device from functioning to cut off the fuel supply.

It is apparent that by adjusting springs 57 so as to preload expansible element 44 to a greater extent than element 43, a minimum differential in expansion of elements 43 and 44 could be maintained even though bulbs 18 and 19 were of the same capacity. The expansion differential could thus be maintained constant throughout a temperature range in which both fluid filled elements were of the same temperature. The use of bulbs of different capacity has, however, proven to be a more satisfactory expedient in practice, chiefly because of the great difference in spring loading required to achieve the same effect, which difference would either require a spring loading so light on one hand as to be impositive in action and for a loading so heavy on the other hand as to set up undue stresses in the movable parts.

Valve stem 27 has a flange 75 intermediate of its length which together with a resilient sealing washer 76 provides a seal against leakage of fuel through the bore 26 when the valve 31 is open.

*In operation*

In the drawing, Fig. 1, the mechanism is shown in the "burner-on" operating position. Fluid filled elements 18 and 19 are both receiving heat from the pilot burner. Element 18 however is receiving heat at a greater rate than element 19 and as a result there is a greater fluid pressure in expansible element 43 than in element 44. This in turn has resulted in the greater relative expansion of element 43 and therefore the clockwise rotation of actuating lever 39. This clockwise rotation of lever 39 has caused its portions 71 to be moved sufficiently in a direction away from detent 66 to permit its lower edge to swing into position under the urging of spring 70, and to abut the shoulder 65 of the valve stem 27, thus latching valve 31 in an open position. Valve 31 will have been previously opened manually by pushing downwardly on reset plunger 59.

After ignition of the pilot burner, elements 18 and 19 continue to absorb heat and expansible elements 43 and 44 will continue to expand until heat absorption and heat loss stabilize. A differential in heat absorption by bulbs 18 and 19 and therefore a differential in expansion of the expansible elements will however maintain throughout the range. This differential may be achieved and/or varied by the relative disposition of bulbs 18 and 19 with respect to the burner flame or by shrouding, baffling, etc.

By maintaining the differential at a practical minimum it will be seen that upon loss of flame, this differential, or a substantial part of it, will be quickly lost, irrespective of the temperature level. This loss of differential will result in a relative contraction of element 43, and under the urging of a spring 57, actuating lever 39 will be rotated counterclockwise and by engagement of its portions 71 with detent 66 will push the detent from the valve stem shoulder 65 thus tripping the mechanism and permitting valve 31 to close.

When it is desired to relight the pilot burner, the plunger 60 is pushed downward, thereby pushing valve stem 27 downward and opening valve 31. By pushing valve stem 27 downward until resilient washer 76 abuts the seat at the upper end of the bore 26, a seal against fuel loss is provided. It is obviously also necessary to push valve stem 27 downward sufficiently to permit the lower edge of detent 66 to swing in and engage the shoulder 65. The resiliency of washer 76 will permit compensation for slight manufacturing variations and insure both a seal for bore 26 and clearance for engagement of the detent with shoulder 65.

After the fuel valve 31 is manually opened the plunger 60 is held down while the pilot burner is ignited, and thereafter until bulb 18 has absorbed sufficient heat from the burner flame to cause the necessary expansion of element 43, and the necessary clockwise rotation of lever 39 to permit the swinging into engagement of detent 66 with shoulder 65 under the urging of spring 79. The line 31 valve is thus latched in an open position.

By the arrangement of pivoting actuating lever 39 on the free end of pivoted yoke 37, both rotational and substantially vertical movement of lever 39 is provided, to take care of both relative and similar expansion or contraction of elements 43 and 44.

The foregoing description is intended to be illustrative and not limiting and the exclusive use of all modifications within the scope of the appended claims is contemplated.

We claim:

1. In a temperature responsive fuel cut-off device in combination, a burner, a valve, resilient means for holding said valve in a closed position, means for opening said valve, means for releasably holding said valve in an open position, valve releasing means including a lever movable toward and away from a valve releasing position, condition responsive means for actuating said lever comprising a first fluid filled element disposed adjacent said burner so as to receive heat therefrom, a first expansible element, fluid conduit means connecting said first elements, said first expansible element being operatively connected to one part of said lever, a second fluid filled element also disposed adjacent said burner but arranged to absorb heat therefrom at a slower rate than said first fluid filled element, a second expansible element having the same proportions as said first expansible element, and fluid conduit means for connecting said second elements, said second fluid filled element having less fluid capacity than said first fluid filled element, whereby a greater expansion of said first expansible element is maintained at high ambient temperatures, said second expansible element being operatively connected to another part of said lever, the arrangement being such that expansion of said first expansible element with relation to said second expansible element causes the lever to move away from a valve releasing position and expansion of said second expansible element with relation to said first expansible element causes the lever to move toward a valve releasing position.

2. In a temperature responsive fuel cut-off device in combination, a burner, a fuel supply system for said burner, a valve in said system, a first fluid filled element disposed adjacent said burner so as to receive heat therefrom, spring means for holding said valve in a closed position, means for releasably holding said valve in an open position, valve releasing means including a lever movable to a valve releasing position, means for opening said valve, a first expansible element, fluid conduit means connecting said first elements, said first expansible element being operatively connected to one part of said lever, a second fluid filled element also disposed adjacent said burner but arranged to absorb heat therefrom at a slower rate than said first fluid filled element, a second expansible element having the same proportions as said first expansible element and fluid conduit means for connecting said second elements, said second fluid filled element having less fluid capacity than said first fluid filled element, whereby a differential in expansion of said expansible elements will be maintained even though both fluid filled bulbs attain the same temperature, said second expansible element being operatively connected to another part of said lever, the arrangement being such that relative expansion of said first expansible element causes the lever to move away from a valve releasing position and a relative contraction of said first expansible element causes the lever to move toward a valve releasing position.

CLAUDE M. GARNER.
WILLIAM J. ALLAN.

REFERENCES CITED

The following references are of record in the file of this patent:

UNITED STATES PATENTS

| Number | Name | Date |
| --- | --- | --- |
| 1,325,896 | Long | Dec. 23, 1919 |
| 1,563,532 | Shadrick | Dec. 1, 1925 |
| 1,773,817 | Leach | Aug. 26, 1930 |
| 1,823,122 | Partlow | Sept. 15, 1931 |
| 1,828,424 | Lovekin | Oct. 20, 1931 |
| 1,846,814 | Ruud | Feb. 23, 1932 |
| 1,848,668 | Scott | Mar. 8, 1932 |
| 1,850,646 | Ross-Watt | Mar. 22, 1932 |
| 1,977,150 | Schmidt | Oct. 16, 1934 |
| 1,994,983 | DeFlorez, et al. | Mar. 19, 1935 |
| 2,171,815 | Thomas | Sept. 5, 1939 |
| 2,295,455 | Dillman | Sept. 8, 1942 |
| 2,379,124 | Wasson | June 26, 1945 |